(12) United States Patent
Yoshida et al.

(10) Patent No.: US 8,492,483 B2
(45) Date of Patent: Jul. 23, 2013

(54) ABA TRIBLOCK COPOLYMER AND PROCESS FOR PRODUCING THE SAME

(75) Inventors: Norihiro Yoshida, Ichihara (JP); Hijiri Aoki, Ichihara (JP); Takahito Mita, Ichihara (JP); Ami Yamaguchi, Ichihara (JP); Kazuhiko Haba, Ichihara (JP); Goro Sawada, Ichihara (JP)

(73) Assignee: Maruzen Petrochemical Co., Ltd., Tokyo (JP)

( * ) Notice: Subject to any disclaimer, the term of this patent is extended or adjusted under 35 U.S.C. 154(b) by 403 days.

(21) Appl. No.: 12/667,785

(22) PCT Filed: Jun. 19, 2008

(86) PCT No.: PCT/JP2008/061198
§ 371 (c)(1),
(2), (4) Date: Jan. 5, 2010

(87) PCT Pub. No.: WO2009/008252
PCT Pub. Date: Jan. 15, 2009

(65) Prior Publication Data
US 2010/0286351 A1    Nov. 11, 2010

(30) Foreign Application Priority Data
Jul. 6, 2007   (JP) ................................. 2007-178151

(51) Int. Cl.
*C08F 4/32*   (2006.01)
*C08F 12/24*  (2006.01)

(52) U.S. Cl.
USPC ........ 525/312; 525/328.9; 526/209; 526/313; 526/332; 526/334

(58) Field of Classification Search
USPC ............... 525/312, 328.9; 526/209, 313, 332, 526/334
See application file for complete search history.

(56) References Cited

U.S. PATENT DOCUMENTS

| 5,225,492 A | 7/1993 | Kennedy et al. |
| 5,849,219 A | 12/1998 | De Laat et al. |
| 2003/0166786 A1 | 9/2003 | Nakagawa et al. |
| 2006/0046515 A1 | 3/2006 | Maruyama et al. |

FOREIGN PATENT DOCUMENTS

| JP | 6 116330 | 4/1994 |
| JP | 6-239944 A | 8/1994 |
| JP | 8-92336 A | 4/1996 |
| JP | 11 80221 | 3/1999 |
| JP | 11 322942 | 11/1999 |
| JP | 2000 198825 | 7/2000 |
| JP | 2001 19770 | 1/2001 |
| JP | 2003 342327 | 12/2003 |
| JP | 2004 35637 | 2/2004 |
| JP | 2004 217705 | 8/2004 |
| JP | 2004 240143 | 8/2004 |
| JP | 2004 244535 | 9/2004 |
| WO | WO 93/04100 | 3/1993 |

OTHER PUBLICATIONS

English Translation of JP 2001-019770.*
Higashimura et al. (Makromol. Chem. Suppl. 1985, 12, 153-161.*

* cited by examiner

*Primary Examiner* — Mark Kaucher
(74) *Attorney, Agent, or Firm* — Oblon, Spivak, McClelland, Maier & Neustadt, L.L.P.

(57) ABSTRACT

To provide a novel ABA-type triblock copolymer of vinyl ether series, comprising polyvinyl ether and an oxystyrene-series unit, and a process of producing the ABA-type copolymer at a series of steps. The invention relates to a novel ABA-type triblock copolymer comprising Segment A comprising an oxystyrene-series repeat unit (a) and Segment B comprising a vinyl ether-series repeat unit (b), in which the Segment A and the Segment B are bonded together with a single bond, and to a simple process of producing the same. The triblock copolymer can be produced at a series of steps in a simple manner, comprising living cationic polymerization of a vinyl ether-series monomer such as ethyl vinyl ether in the presence of a bifunctional initiator and a Lewis acid, and subsequently adding an oxystyrene-series monomer such as p-hydroxystyrene for living cationic polymerization.

24 Claims, No Drawings

ABA TRIBLOCK COPOLYMER AND PROCESS FOR PRODUCING THE SAME

TECHNICAL FIELD

The present invention relates to a novel ABA-type triblock copolymer of vinyl ether series and a process of producing the same. More specifically, the invention relates to an ABA-type triblock copolymer comprising polyvinyl ether as the soft segment and an oxystyrene-series polymer as the hard segment, and a process of producing the same.

BACKGROUND ART

Polymers of oxystyrene series primarily including hydroxystyrene are used as functional polymer materials in various industrial fields. In particular, such polymers are used in the field of electron materials, particularly as raw materials for resin components for semiconductor resists. Additionally, such polymers are now being investigated for use as photosensitive resin components for layer insulation films and surface protective films of semiconductor devices and the like. Improvement in the properties of oxystyrene-series polymers and imparting novel properties to oxystyrene-series polymers are desired due to the high integration and enlarged size of semiconductor devices, the thinner and downsized sealing resin packages, transfer to surface mounting with solder reflow and the like. In view of this, it is now attempted to introduce various structure units into oxystyrene-series polymers by copolymerizing oxystyrene-series polymers with monomers copolymerizable with the oxystyrene-series polymers.

For example, Patent Document 1 proposes a photosensitive resin composition obtained by using a hydroxystyrene-series ABA-type triblock copolymer which uses an elastomer block including butadiene and isoprene as the component B. Patent Document 1 describes that the thermal shock resistance of polyhydroxystyrene can be improved by introducing the elastomer block including butadiene and isoprene. However, the segment including butadiene and isoprene has poor solubility in developing solutions and poor adhesion to substrates, so the ratio of the segment could not be raised and the effect of improving the thermal shock resistance was not sufficient.

Alternatively, oxystyrene-series monomers primarily including hydroxystyrene have cationic polymerization reactivity, being greatly different from those of vinyl ether-series monomers. Hence, it has been very difficult to obtain a copolymer of an oxystyrene-series monomer and a vinyl ether-series monomer.

For example, Patent Document 2 describes a method for producing a narrowly dispersible copolymer of an oxystyrene-series monomer and a vinyl ether-series monomer by living cationic polymerization, using a halogenated organic compound and a metal halide with Lewis acidity as initiators. Due to the difference in polymerization profiles between the respective monomers, the ratio of the vinyl ether monomer in the copolymer cannot be raised and thus, the ratio of the vinyl ether-series monomer incorporated in the copolymer was about 15 mol % at the most. In Patent Document 2, further, an oxystyrene-series monomer and a vinyl ether-series monomer are preliminarily mixed together and made to react using a monofunctional initiator. In such system, it is considered that only the vinyl ether-series monomer with fast reactivity is polymerized first and then, the oxystyrene-series monomer is polymerized continuously. Once an oxystyrene-series monomer is added to the resulting polymer, the vinyl ether-series monomer with significantly different reactivity no longer reacts with the resulting product, so the polymer obtained is not a random copolymer but a diblock copolymer, meaning that ABA-type triblock copolymer could not be obtained. Due to the same reason, it was difficult to synthetically prepare an ABA-type triblock copolymer by sequential reactions of an oxystyrene-series monomer and a vinyl ether-series monomer using a monofunctional initiator.

Various approaches have been studied, including separately preparing a polystyrene-series polymer and polyvinyl ether under different polymerization conditions, subsequently introducing a substituent at the end of the polyvinyl ether, and linking the polystyrene-series polymer through the substituent to the polyvinyl ether.

For example, Patent Document 3 discloses a method for producing a block polymer comprising a polystyrene-series polymer component and a polyvinyl ether-series polymer component, comprising preparing polyvinyl ether having hydroxyl group at the end of the polymer by living cationic polymerization of vinyl ether using a polymerization initiator with hydroxyl group protected with trimethylsilyl group and the like and subsequently conducting cationic polymerization of styrenes using the resulting polyvinyl ether as a terminator. Even in Patent Document 3, it is only a diblock polymer of polystyrene and poly(t-butyl vinyl ether) that is specifically described about the synthesis thereof. There are no examples shown in Patent Document 3 of the synthesis of an ABA-type triblock copolymer of polyvinyl ether and an oxystyrene-series polymer. Additionally, a block copolymer obtained by using polyvinyl ether comprising hydroxyl group at the end of the polymer as a terminator is disadvantageous in that it is thermally unstable because the polystyrene-series polymer component and the polyvinyl ether-series polymer component are linked together through an ether bond.

Patent Document 4 discloses a method for producing polyalkenyl ether with thiol group at both ends of the polymer comprising living cationic polymerization of vinyl ether using alkenyl ether with thiocarbonyl ester bond at a side chain as an initiator and a specific thiocarboxylate salt or a thioester compound as a terminator. The polyalkenyl ether with thiol group at both ends as obtained by the above method are used as a chain transfer agent to polymerize various vinyl polymers which are radical-polymerizable to obtain an ABA-type triblock polymer having the polyalkenyl ether as the center block (as the component B). Patent Document 4 however does not show any specific synthetic example of the block polymer nor disclose any polymerization method of a ABA-type triblock copolymer of polyvinyl ether and an oxystyrene-series polymer. In case where the polyalkenyl ether with thiol group at the ends of the polymer is used as a chain transfer agent, the resulting ABA-type triblock copolymer is thermally unstable because the component A and the component B are bonded together through sulfur atom, so that the triblock copolymer is readily colored during drying or heating, which is disadvantageous. With the radical polymerization method, polymerization can be performed in a simple manner but the molecular weight distribution cannot be controlled. Hence, there is a problem that narrow polymer which is narrowly dispersible cannot be obtained by the method.

In any of the methods, it is essential to prepare the segment comprising polyvinyl ether and the segment comprising an oxystyrene-series polymer synthetically in separate steps. Thus, the methods were laborious.

As described above, there are no reports describing about a ABA-type triblock copolymer comprising polyvinyl ether and an oxystyrene-series polymer. Therefore, there is a demand for development of a thermally stable ABA-type triblock copolymer comprising polyvinyl ether as the center block and a simple process of producing the same.
Patent Document 1: JP-A-2004-240143
Patent Document 2: JP-A-2003-342327
Patent Document 3: JP-A-2001-19770
Patent Document 4: JP-A-H6-116330

DISCLOSURE OF THE INVENTION

Problems that the Invention is to Solve

It is an object of the invention to provide a novel ABA-type triblock copolymer of vinyl ether series, comprising polyvinyl ether and an oxystyrene-series polymer, and a simple process of continuously producing the ABA-type copolymer in a series of steps.

Means for Solving the Problems

In such circumstances, the inventors of the present invention made extensive studies and as a result, they found that a novel ABA-type triblock copolymer of vinyl ether series comprising polyvinyl ether as the center block could be obtained by synthetically preparing polyvinyl ether via living cationic polymerization using a specific bifunctional initiator, and continuously promoting the living cationic polymerization of an oxystyrene-series polymer while retaining the reactivity during the synthetic preparation. They also found that the resulting triblock copolymer was thermally stable because the component A and the component B were bonded together with a single bond, thereby completing the present invention.

Specifically, the ABA-type triblock copolymer of vinyl ether series in accordance with the invention comprises:

Segment A comprising an oxystyrene-series repeat unit (a) represented by the following general formula (1):

[Formula 1]

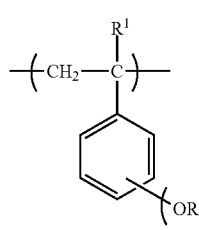

(1)

(wherein in the formula, $R^1$ represents hydrogen atom or an alkyl group with 1 to 4 carbon atoms; $R^2$ represents anyone of hydrogen atom, alkyl groups with 1 to 6 carbon atoms, alkoxyalkyl groups with 2 to 6 carbon atoms, acyl groups with 2 to 6 carbon atoms, alkoxycarbonyl groups with 2 to 6 carbon atoms, alkoxycarbonylalkyl groups with 2 to 6 carbon atoms, or alkylsilyl groups with 2 to 6 carbon atoms; and n represents a numerical figure of 1 or 2);
and Segment B comprising vinyl ether-series repeat unit (b) represented by the following general formula (2):

[Formula 2]

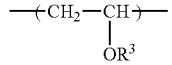

(2)

(wherein in the formula, $R^3$ represents a linear or branched alkyl group with 1 to 6 carbon atoms, a fluoroalkyl group as a linear or branched alkyl group with 1 to 6 carbon atoms in which all or a part of the hydrogens in the alkyl group is substituted with fluorine, an alkoxyalkyl group with 2 to 6 carbon atoms, a cycloalkyl group with 5 to 10 carbon atoms or an aryl group or arylalkyl group represented by

(herein, m is 0, 1, 2 or 3; X represents unsubstituted phenyl group, or phenyl group substituted with one or more linear or branched alkyl groups with 1 to 4 carbon atoms, a fluoroalkyl group as a linear or branched alkyl group with 1 to 4 carbon atoms in which all or a part of the hydrogens is substituted with fluorine, an alkoxy group with 1 to 4 carbon atoms, or a halogen atom)], wherein the Segment A and the Segment B are bonded together with a single bond.

In the ABA-type triblock copolymer of vinyl ether series in accordance with the present invention, the preferred ratio of the repeat unit (a) to the total repeat units contained in the polymer chain is 5 to 80 mol %, while the preferred ratio of the repeat unit (b) thereto is 20 to 95 mol %.

In the ABA-type triblock copolymer of vinyl ether series in accordance with the present invention, the weight average molecular weight (Mw) on a polystyrene basis as measured by gel permeation chromatography (GPC) is preferred to be within a range of 1,000 to 100,000, while the dispersion degree (Mw/Mn) represented as the ratio of the weight average molecular weight (Mw) to the number average molecular weight (Mn) is preferred to be 2.0 or less.

The ABA-type triblock copolymer can be produced by living cationic polymerization of a vinyl ether-series monomer represented by the following general formula (3) in the presence of a bifunctional initiator, a Lewis acid and a solvent:

[Formula 3]

(3)

(wherein in the formula, $R^3$ has the same definition as described above for Formula (2)), and adding an oxystyrene-series monomer represented by the following general formula (4) for living cationic polymerization:

[Formula 4]

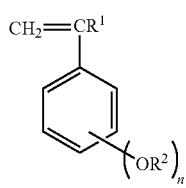

(4)

(wherein in the formula, $R^4$ and $R^2$ have the same definitions as described above for Formula (1)).

As the bifunctional initiator, those in a structure represented by the following general formula (5) can be used.

[Formula 5]

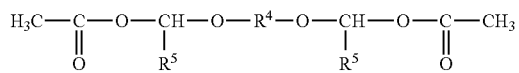

(5)

(wherein in the formula, $R^4$ represents an alkylene group with 1 to 10 carbon atoms; and $R^5$ represents hydrogen atom or an alkyl group with 1 to 4 carbon atoms).

Advantages of the Invention

The ABA-type triblock copolymer of vinyl ether series in accordance with the present invention is a novel ABA-type triblock copolymer of vinyl ether series, wherein polyvinyl ether is the center block (block B) and the oxystyrene-series polymer is the block at both ends (block A). The ABA-type triblock copolymer is thermally stable because the block A and the block B are bonded together with a single bond.

In particular, in a triblock copolymer comprising a hydroxystyrene-series polymer as the block at both ends (block A) and polyvinyl ether of a lower alkyl series as the center block (block B), the thermal shock resistance of polyhydroxystyrene can be improved and it has excellent adhesion to substrates and great solubility in developing solutions, owing to the ether bond derived from vinyl ether. Hence, the triblock copolymer can preferably be used as a raw material for photosensitive resin components suitable for applications such as layer insulation films and surface protective films of semiconductor devices.

According to the process of producing the ABA-type triblock copolymer of vinyl ether series in accordance with the present invention, the polymerization of polyvinyl ether and the polymerization of the oxystyrene-series polymer can continuously be conducted in one pot. Accordingly, the process can simplify the production steps and production equipment therefore and is industrially advantageous.

BEST MODE FOR CARRYING OUT THE INVENTION

The ABA-type triblock copolymer of vinyl ether series in accordance with the invention and the process of producing the same are specifically described below.

In the triblock copolymer of the present invention, the oxystyrene-series repeat unit (a) represented by the general formula (1) can be prepared from an oxystyrene-series monomer represented by the general formula (4). In the definition of $R^1$ for the general formula (1) and the general formula (4), the alkyl group with 1 to 4 carbon atoms include, for example, methyl group, ethyl group, propyl group, isopropyl group, n-butyl group, sec-butyl group, tert-butyl group and isobutyl group.

In the definition of $R^2$ for the general formula (1) and the general formula (4), the alkyl group with 1 to 6 carbon atoms includes, for example, methyl group, ethyl group, propyl group, isopropyl group, n-butyl group, sec-butyl group, tert-butyl group, isobutyl group, n-amyl group and isoamyl group; the alkoxyalkyl group with 2 to 6 carbon atoms includes, for example, methoxymethyl group, ethoxymethyl group, 1-methoxyethyl group, 1-ethoxyethyl group, 1-methoxypropyl group, 2-tetrahydropyranyl group, and 2-tetrahydrofuranyl group; the acyl group with 2 to 6 carbon atoms includes for example acetyl group, propionyl group and tert-butylcarbonyl group; the alkoxycarbonyl group with 2 to 6 carbon atoms includes, for example, methoxycarbonyl group, ethoxycarbonyl group, propoxycarbonyl group and tert-butoxycarbonyl group; the alkoxycarbonylalkyl group with 2 to 6 carbon atoms includes, for example, tert-butoxycarbonylmethyl group; and the alkylsilyl group with 2 to 6 carbon atoms includes, for example, trimethylsilyl group and tert-butyldimethylsilyl group.

Because these substituents represented by $R^2$ are readily eliminated with acids to give hydroxyl group, additionally, the resulting triblock copolymer is deprotected with an acid catalyst, to obtain a triblock copolymer comprising a hydroxystyrene-series repeat unit in the Segment A.

The oxystyrene-series monomer represented by the general formula (4) includes, for example, hydroxystyrenes such as p-hydroxystyrene, m-hydroxystyrene, o-hydroxystyrene, p-isopropenylphenol, m-isopropenylphenol, and o-isopropenylphenol; alkoxystyrenes such as p-methoxystyrene, m-methoxystyrene, p-ethoxystyrene, m-ethoxystyrene, p-propoxystyrene, m-propoxystyrene, p-isopropoxystyrene, m-isopropoxystyrene, p-n-butoxystyrene, m-n-butoxystyrene, p-isobutoxystyrene, m-isobutoxystyrene, p-tert-butoxystyrene, and m-tert-butoxystyrene; alkoxyalkyloxystyrenes such as p-methoxymethoxystyrene, m-methoxymethoxystyrene, p-(1-ethoxyethoxy)styrene, m-(1-ethoxyethoxy)styrene, p-(2-tetrahydropyranyl)oxystyrene, and m-(2-tetrahydropyranyl)oxystyrene; alkanoyloxystyrenes such as p-acetoxystyrene, m-acetoxystyrene, p-tert-butylcarbonyloxystyrene, and m-tert-butylcarbonyloxystyrene; alkoxycarbonyloxystyrenes such as p-methoxycarbonyloxystyrene, m-methoxycarbonyloxystyrene, p-tert-butoxycarbonyloxystyrene, and m-tert-butoxycarbonyloxystyrene; alkoxycarbonylalkyloxystyrenes such as p-tert-butoxycarbonylmethyloxystyrene, and m-tert-butoxycarbonylmethyloxystyrene; and alkylsilyloxystyrenes such as p-trimethylsilyloxystyrene, m-trimethylsilyloxystyrene, p-tert-butyldimethylsilyloxystyrene, and m-tert-butyldimethylsilyloxystyrene.

Among others, p-hydroxystyrene, m-hydroxystyrene, p-isopropenylphenol, m-isopropenylphenol, p-tert-butoxystyrene, m-tert-butoxystyrene, p-acetoxystyrene and m-acetoxystyrene are preferably used.

The vinyl ether-series repeat unit (b) represented by the general formula (2) in the triblock copolymer of the invention is formed from a vinyl ether-series monomer represented by the general formula (3). In the definition of $R^3$ for the general formula (2) and the general formula (3), the linear or branched alkyl group with 1 to 6 carbon atoms includes, for example, methyl group, ethyl group, propyl group, isopropyl group, n-butyl group, sec-butyl group, tert-butyl group, isobutyl group, n-amyl group and isoamyl group; the fluoroalkyl group with 1 to 6 carbon atoms includes, for example, trifluoromethyl group, pentafluoroethyl group and 2,2,2-trifluoroethyl group; the alkoxyalkyl group with 2 to 6 carbon atoms includes, for example, methoxymethyl group, ethoxymethyl group, 2-methoxyethyl group, 2-ethoxyethyl group, 2-tetrahydropyranyl group, and 2-tetrahydrofuranyl group; the cycloalkyl group with 5 to 10 carbon atoms includes, for example, cyclopentyl group, cyclohexyl group, cycloheptyl group, cyclooctyl group, bicyclo[2.2.1]heptyl group, bicyclo[2.2.2]octyl group, tricyclo[5.2.1.0$^{2,6}$]decanyl group, and adamantly group; the aryl group includes, for example, phenyl group, methylphenyl group, ethylphenyl group, methoxyphenyl group, ethoxyphenyl group, fluorophenyl group, and trifluoromethylphenyl group; the aralkyl group includes, for example, benzyl group, methylbenzyl group, ethylbenzyl group, methoxybenzyl group, ethoxybenzyl group, fluorobenzyl group and trifluoromethylbenzyl group.

The vinyl ether-series monomer represented by the general formula (3) includes, for example, alkyl vinyl ethers such as methyl vinyl ether, ethyl vinyl ether, propyl vinyl ether, isopropyl vinyl ether, n-butyl vinyl ether, sec-butyl vinyl ether, tert-butyl vinyl ether, isobutyl vinyl ether, n-amyl vinyl ether, and isoamyl vinyl ether; fluoroalkyl vinyl ethers such as trifluoromethyl vinyl ether, pentafluoroethyl vinyl ether, and 2,2,2-trifluoroethyl vinyl ether; alkoxyalkyl vinyl ethers such as 2-methoxyethyl vinyl ether, 2-ethoxyethyl vinyl ether, 2-tetrahydropyranyl vinyl ether, and 2-tetrahydrofuranyl vinyl ether; cycloalkyl vinyl ethers such as cyclopentyl vinyl ether, cyclohexyl vinyl ether, cycloheptyl vinyl ether, cyclooctyl vinyl ether, 2-bicyclo[2.2.1]heptyl vinyl ether, 2-bicyclo[2.2.2]octyl vinyl ether, 8-tricyclo[5.2.1.0$^{2,6}$]decanyl vinyl ether, 1-adamantyl vinyl ether, and 2-adamantyl vinyl ether; aryl vinyl ethers such as phenyl vinyl ether, 4-methylphenyl vinyl ether, 4-trifluoromethylphenyl vinyl ether, and 4-fluorophenyl vinyl ether; and arylalkyl vinyl ethers such as benzyl vinyl ether and 4-fluorobenzyl vinyl ether.

In case that polyvinyl ether is to be introduced as the soft segment so as to improve the flexibility and shock resistance of the oxystyrene-series polymer, in particular, methyl vinyl ether, ethyl vinyl ether, propyl vinyl ether, isopropyl vinyl ether, n-butyl vinyl ether, sec-butyl vinyl ether, tert-butyl vinyl ether, isobutyl vinyl ether, n-amyl vinyl ether, isoamyl vinyl ether, trifluoromethyl vinyl ether, pentafluoroethyl vinyl ether, 2,2,2-trifluoroethyl vinyl ether, 2-methoxyethyl vinyl ether, 2-ethoxyethyl vinyl ether and the like are preferably used. In particular, lower alkyl vinyl ethers such as methyl vinyl ether, ethyl vinyl ether, propyl vinyl ether, isopropyl vinyl ether, n-butyl vinyl ether, sec-butyl vinyl ether, tert-butyl vinyl ether, isobutyl vinyl ether, n-amyl vinyl ether, and isoamyl vinyl ether are preferably used.

These oxystyrene-series monomers and vinyl ether-series monomers may be used singly or may be used in combination with two or more thereof.

The ratio of the repeat unit (a) and the repeat unit (b) in the triblock copolymer of the present invention is appropriately determined, depending on the use, the purpose, and the function to be desirably exerted. In case that the triblock copolymer of the invention is used as a raw material for photosensitive resin components suitable for applications such as layer insulation films and surface protective films of semiconductor devices, the preferred ratio of the repeat unit (a) to the total repeat units contained in the polymer chain is 5 to 80 mol %, 10 to 70 mol % being more preferred, while the ratio of the repeat unit (b) thereto is 20 to 95 mol %, 30 to 90 mol % being more preferred. When the ratio of the repeat unit (a) of (hydro)oxystyrene series is less than the range described above, the developing property and the adhesion property may sometimes be deteriorated. When the ratio of the repeat unit (b) of vinyl ether series is less than the range described above, the effect of improving thermal shock resistance cannot be obtained.

Similarly, the molecular weight of the triblock copolymer of the invention is appropriately determined, depending on the use, the purpose and the function to be desirably exerted. In case that the triblock copolymer of the invention is used as a raw material for photosensitive resin components suitable for applications such as layer insulation films and surface protective films of semiconductor devices, the weight average molecular weight (Mw) thereof on a polystyrene basis as measured by gel permeation chromatography (GPC) is preferred to be 1,000 to 100,000, 2,000 to 80,000 being more preferred, and 4,000 to 60,000 being even more preferred. The preferred dispersion degree (Mw/Mn) represented by the ratio of the weight average molecular weight (Mw) and the number average molecular weight (Mn) is 1.0 to 2.0, 1.0 to 1.8 being more preferred, and 1.0 to 1.6 being even more preferred. When Mw is larger than the range, the solubility thereof in a solvent to be used for forming a coat film or in alkaline developing solutions is deteriorated. When Mw is smaller than the range, the properties of the coat film may sometimes be deteriorated.

The triblock copolymer of the invention can be obtained by living cationic polymerization of a vinyl ether-series monomer represented by the general formula (3) in the presence of a bifunctional initiator, a Lewis acid and a solvent and subsequently adding an oxystyrene-series monomer represented by the general formula (4) for living cationic polymerization thereof.

The bifunctional initiator to be used in the polymerization is preferred to be a compound represented by the general formula (5). Specific examples of the alkylene group with 1 to 10 carbon atoms as represented by $R^4$ for the general formula (5) are methylene group, ethylene group, trimethylene group, tetramethylene group, pentamethylene group, hexamethylene group, heptamethylene group, octamethylene group, nonamethylene group, decamethylene group, and cyclohexylene group. Specific examples of the alkyl group with 1 to 4 carbon atoms in the definition of $R^5$ include, for example, methyl group, ethyl group, propyl group, isopropyl group, n-butyl group, sec-butyl group, tert-butyl group and isobutyl group.

Specific examples of the compound represented by the general formula (5) are 1,1-bis(1-acetoxymethoxy)methane, 1,2-bis(1-acetoxymethoxy)ethane, 1,3-bis(1-acetoxymethoxy)propane, 1,4-bis(1-acetoxymethoxy)ethane, 1,2-bis(1-acetoxymethoxy)butane, 1,5-bis(1-acetoxymethoxy)ethane, 1,2-bis(1-acetoxymethoxy)pentane, 1,6-bis(1-acetoxymethoxy)hexane, 1,7-bis(1-acetoxymethoxy)heptane, 1,8-bis(1-acetoxymethoxy)octane, 1,9-bis(1-acetoxymethoxy)nonane, 1,10-bis(1-acetoxymethoxy)decane, 1,1-bis(1-acetoxyethoxy)methane, 1,2-bis(1-acetoxyethoxy)ethane, 1,3-bis(1-acetoxyethoxy)propane, 1,4-bis(1-acetoxyethoxy)butane, 1,5-bis(1-acetoxyethoxy)pentane, 1,6-bis(1-acetoxyethoxy)hexane, 1,7-bis(1-acetoxyethoxy)heptane, 1,8-bis(1-acetoxyethoxy)octane, 1,9-bis(1-acetoxyethoxy)nonane, 1,10-bis(1-acetoxyethoxy)decane, 1,4-bis(1-acetoxymethoxy)cyclohexane, and 1,4-bis(1-acetoxyethoxy)cyclohexane. Among them, for example, 1,4-bis(1-acetoxyethoxy)butane and 1,4-bis(1-acetoxyethoxy)cyclohexane are preferably used. These compounds can be obtained by adding acetic acid to 1,4-buanediol divinyl ether or 1,4-cyclohexanediol divinyl ether.

The bifunctional initiator may satisfactorily be added at any amount, with no specific limitation. The amount may appropriately be determined, depending on the molecular weight of the intended copolymer.

As the Lewis acid to be used in the polymerization, additionally, Lewis acids to be generally used for cationic polymerization of vinyl ether-series monomers may be used with no specific limitation. Specifically, for example, organic metal halides such as $Et_{1.5}AlCl_{1.5}$ and metal halides such as $TiCl_4$, $TiBr_4$, $BCl_3$, $BF_3$, $BF_3 \cdot OEt_2$, $SnCl_2$, $SnCl_4$, $SbCl_5$, $SbF_5$, $WCl_6$, $TaCl_5$, $VCl_5$, $FeCl_3$, $ZnBr_2$, $AlCl_3$, and $AlBr_3$ can preferably be used. These Lewis acids may be used singly or plural Lewis acids may be used in combination. In case that the difference in the reaction velocities of monomers composing the individual block segments is large, in particular, a polymerization process using two types of Lewis acids is effective. A process of producing the ABA-type triblock copolymer by using an organic metal halide such as $Et_{1.5}AlCl_{1.5}$ as the Lewis acid during polymerization of the block B and additionally using a metal halide such as $SnCl_4$ during polymerization of the block A, to accelerate the polymerization rate of the component A is preferred.

The amount of the Lewis acids to be used is not specifically limited. However, the amount thereof may be determined, taking account of, for example, the polymerization properties or polymerization concentration of a vinyl ether-series monomer to be used. Generally, the Lewis acids can be used at 0.1 to 100 mol % to the vinyl ether-series monomer, the preferable range being 1 to 50 mol %.

The method for adding the Lewis acids includes, for example, addition in a lump, addition in fractional amounts, and addition in a continuous manner. Addition in fractional amounts and addition in a continuous manner are more preferred. There is an advantage in using the methods of addition in fractional amounts and addition in a continuous manner because living cationic polymerization can be effected under a state in which the polymerization heat is suppressed, thereby a triblock copolymer with a suppressed distribution of the molecular weight can be produced.

The solvent for the polymerization includes, for example, aromatic hydrocarbon solvents such as benzene, toluene and xylene; aliphatic hydrocarbon-series solvents such as propane, n-butane, isobutane, n-pentane, n-hexane, n-heptane, n-octane, isooctane, decane, hexadecane, isopentane and n-hexane; halogenated hydrocarbon-series solvents such as ethylene chloride, methylene chloride, and carbon tetrachloride; and ether-series solvents such as tetrahydrofuran (THF), dioxane, diethyl ether, dibutyl ether, and ethylene glycol diethyl ether. Among these solvents, toluene, methylene chloride and THF are preferably used. These solvents may be used singly or may be used in combination of two or more thereof.

The polymerization is carried out by first introducing a solvent, a vinyl ether-series monomer and a bifunctional initiator sequentially in a reactor and subsequently adding a Lewis acid therein. In this step, first, the Segment B comprising the vinyl ether-series repeat unit (b) is synthetically prepared. Then, an oxystyrene-series monomer is added on termination of the conversion of the vinyl ether-series monomer and a Lewis acid is further added if necessary, promoting the polymerization in a continuous manner in a series of steps within the same reactor. In this step, the Segment A comprising the oxystyrene-series repeat unit (a) bonded through a single bond to both ends of the Segment B is synthetically prepared to obtain an ABA-type triblock copolymer in which the Segment A and the Segment B are bonded together with a single bond.

The polymerization conditions vary, depending on the Lewis acid, the bifunctional initiator, the monomer and the solvent to be used. The preferred polymerization temperature is, in general, within a range of −80° C. to 150° C., more preferred range being −78° C. to 80° C. The polymerization time period is, in general, within a range of 10 hours to 250 hours.

To obtain an ABA-type triblock copolymer with a hydroxystyrene-series repeat unit by deprotecting the protective group of the oxystyrene-series repeat unit, the protective group is eliminated via a reaction in a solvent with an acid catalyst such as hydrochloric acid or sulfuric acid at a reaction temperature of 50 to 150° C. for a reaction time of 1 to 30 hours, so that the oxystyrene-series repeat unit is converted to the hydroxystyrene-series repeat unit.

EXAMPLES

The invention is now described with reference to Examples. However, the invention should not be limited by these Examples. The physico-chemical properties of copolymers obtained in the Examples were evaluated by the following methods.

Mean copolymer composition: as determined on the basis of the results of $^{13}$C-NMR.

Weight average molecular weight Mw and molecular weight distribution Mw/Mn: as determined on a standard polystyrene curve by gel permeation chromatography (GPC) [RI detector: column KF-801+KF-805L manufactured by Shodex Corporation; tetrahydrofuran as eluent].

Example 1

Production of P-Tert-Butoxystyrene/Ethyl Vinyl Ether/P-Tert-Butoxystyrene-Series Triblock Polymer A glass container with a three way valve was prepared; after the inside of the glass container was substituted with argon, the glass container was heated in argon atmosphere to remove the water adsorbed to the inside of the glass container. 0.85 mole (abbreviated as "M" hereinafter) of ethyl vinyl ether (referred to as "EVE" hereinafter), 1.0 M of ethyl acetate, 4 millimoles (abbreviated as "mM" hereinafter) of 1,4-bis(1-acetoxyethoxy)butane, and 60 ml of toluene were placed in the container, and just when the temperature of the system reached 0° C., a toluene solution (20 mM) of $Et_{1.5}AlCl_{1.5}$ was added to the glass container to initiate the polymerization.

The EVE conversion ratio was monitored by gas chromatography (GC) periodically over time. On completion of the conversion of the EVE monomer, 1.28 M of p-tert-butoxystyrene (referred to as "PTBOS" hereinafter) were added to the reaction solution and the reaction was continuously promoted at a reaction temperature of 0° C. 106 hours after PTBOS addition, a toluene solution (20 mM) of $Et_{1.5}AlCl_{1.5}$ was further added to the glass container for 48-hour reaction.

Methanol was added to the polymerization system to terminate the reaction; aluminium oxide was added at 4% by mass to the reaction mixture solution and 24-hour agitation was conducted to adsorb and remove the catalyst; and then, aluminium oxide was removed through a filter of a pore size of 0.1 μm. The filtrate was concentrated under reduced pressure with an evaporator to obtain the triblock polymer of PTBOS/EVE/PTBOS series.

The mean composition (in molar ratio) of the triblock polymer is PTBOS/EVE=60/40, with a weight average molecular weight Mw of 37,800 and a number average molecular weight Mn of 26,100 at a molecular weight distribution (dispersion degree: Mw/Mn) of 1.45.

Example 2

Production of P-Hydroxystyrene/Ethyl Vinyl Ether/P-Hydroxystyrene-Series Triblock Polymer (Via Deprotection of the PTBOS/EVE/PTBOS-Series Triblock Polymer)

100 parts by mass of the PTBOS/EVE/PTBOS-series triblock polymer obtained in Example 1 and 300 parts by mass of propylene glycol monomethyl ether were placed in a fournecked flask with a thermometer and a reflux condenser and heated to 60° C. under agitation; subsequently, 3.5 parts by mass of 10% sulfuric acid were added in the flask for agitation at 60° C. for 30 hours.

After completion of the reaction, the reaction solution was cooled to ambient temperature; and the reaction solution was put into 1,200 parts by mass of water to deposit the resulting polymer, which was filtered and recovered. The resulting deposit was dried under reduced pressure, to obtain a triblock polymer of p-hydroxystyrene/EVE/p-hydroxystyrene series.

The mean composition (in molar ratio) of the triblock polymer is p-hydroxystyrene/EVE=60/40, with a weight average molecular weight Mw of 40,000 and a number average molecular weight Mn of 25,700 at a molecular weight distribution (dispersion degree: Mw/Mn) of 1.56.

Example 3

Production of P-Tert-Butoxystyrene/N-Butyl Vinyl Ether/P-Tert-Butoxystyrene-Series Triblock Polymer A glass container with a three way valve was prepared; after the inside of the glass container was substituted with argon, the glass container was heated in argon atmosphere to remove the water adsorbed to the inside of the glass container. 0.85 M of n-butyl vinyl ether (referred to as "NBVE" hereinafter), 1.0 M of ethyl acetate, 4 mM of 1,4-bis(1-acetoxyethoxy)butane, and 60 ml of toluene were placed in the container, and just when the temperature of the system reached 0° C., a toluene solution (20 mM) of $Et_{1.5}AlCl_{1.5}$ was added to the glass container to initiate the polymerization.

The NBVE conversion ratio was monitored by GC. On completion of the conversion of the NBVE monomer, 0.51 M of PTBOS was added to the reaction solution and the reaction was continuously promoted at a reaction temperature of 0° C. 160 hours after PTBOS addition, a toluene solution (20 mM) of $Et_{1.5}AlCl_{1.5}$ was further added to the glass container for 24-hour reaction.

Methanol was added to the polymerization system to terminate the reaction; aluminium oxide was added at 4% by mass to the reaction mixture solution and 24-hour agitation was conducted to adsorb and remove the catalyst; and then, aluminium oxide was removed through a filter of a pore size of 0.1 µm. The filtrate was concentrated under reduced pressure with an evaporator to obtain the triblock polymer of PTBOS/NBVE/PTBOS series.

The mean composition (in molar ratio) of the triblock polymer is PTBOS/NBVE=36/64, with a weight average molecular weight Mw of 38,800 and a number average molecular weight Mn of 20,700 at a molecular weight distribution (dispersion degree: Mw/Mn) of 1.88.

Example 4

Production of P-Hydroxystyrene/N-Butyl Vinyl Ether/P-Hydroxystyrene-Series Triblock Polymer (Via Deprotection of the PTBOS/NBVE/PTBOS-Series Triblock Polymer)

3.0 parts by mass of the PTBOS/NBVE/PTBOS-series triblock polymer obtained in Example 3 and 8.6 parts by mass of dioxane were placed in a flask with a reflux condenser and heated to 70° C. under agitation; subsequently, 0.158 part by mass of p-toluenesulfonic acid•monohydrate was added in the flask for agitation at 70° C. for 2 hours.

After completion of the reaction, the reaction solution was cooled to ambient temperature; and the reaction solution was put into 23 parts by mass of water to deposit the resulting polymer, which was filtered. The resulting filtered resin was dissolved in 5.5 parts by mass of methyl ethyl ketone (MEK), to which 24 parts by mass of water were added for depositing and filtering the polymer again. After the procedure was repeatedly carried out twice, the filtered resin was dried under reduced pressure, to obtain a triblock polymer of p-hydroxystyrene/NBVE/p-hydroxystyrene series.

The mean composition (in molar ratio) of the triblock polymer is p-hydroxystyrene/NBVE=35/65, with a weight average molecular weight Mw of 39,600 and a number average molecular weight Mn of 20,000 at a molecular weight distribution (dispersion degree: Mw/Mn) of 1.98.

Example 5

Production of P-Acetoxystyrene/Ethyl Vinyl Ether/P-Acetoxystyrene-Series Triblock Polymer A glass container with a three way valve was prepared; after the inside of the glass container was substituted with argon, the glass container was heated in argon atmosphere to remove the water adsorbed to the inside of the glass container. 0.85 M of EVE, 1.0 M of ethyl acetate, 4 mM of 1,4-bis(1-acetoxyethoxy)butane, and 60 ml of toluene were placed in the container, and just when the temperature of the system reached 0° C., a toluene solution (20 mM) of $Et_{1.5}AlCl_{1.5}$ was added to the glass container to initiate the polymerization.

The EVE conversion ratio was monitored by GC. On completion of the conversion of the EVE monomer, 0.3 M of p-acetoxystyrene was added to the reaction solution and the reaction was continuously promoted at a reaction temperature of 0° C. 20 hours after the addition of p-acetoxystyrene a toluene solution (20 mM) of $SnCl_4$ was further added to the glass container for 120-hour reaction.

Methanol was added to the polymerization system to terminate the reaction; aluminium oxide was added at 4% by mass to the reaction mixture solution and 24-hour agitation was conducted to adsorb and remove the catalyst; and then, aluminium oxide was removed through a filter of a pore size of 0.1 µm. The filtrate was concentrated under reduced pressure with an evaporator to obtain the triblock polymer of p-acetoxystyrene/EVE/p-acetoxystyrene series.

The mean composition (in molar ratio) of the triblock polymer is p-acetoxystyrene/EVE=25/75, with a weight average molecular weight Mw of 14,100 and a number average molecular weight Mn of 11,200 at a molecular weight distribution (dispersion degree: Mw/Mn) of 1.27.

Example 6

Production of P-Isopropenylphenol/Ethyl Vinyl Ether/P-Isopropenylphenol-Series Triblock Polymer A glass container with a three way valve was prepared; after the inside of the glass container was substituted with argon, the glass container was heated in argon atmosphere to remove the water adsorbed to the inside of the glass container. 0.85 M of EVE, 1.0 M of ethyl acetate, 6 mM of 1,4-bis(1-acetoxyethoxy)butane, and 60 ml of toluene were placed in the container, and just when the temperature of the system reached 0° C., a toluene solution (20 mM) of $Et_{1.5}AlCl_{1.5}$ was added to the glass container to initiate the polymerization.

The EVE conversion ratio was monitored by GC. On completion of the conversion of the EVE monomer, 0.12 M of p-isopropenylphenol (referred to as "PIPP" hereinafter) was added to the reaction solution and the reaction was continuously promoted at a reaction temperature of 0° C. 60 hours after PIPP addition a toluene solution (20 mM) of $Et_{1.5}AlCl_{1.5}$ was further added to the glass container for 90-hour reaction.

Methanol was added to the polymerization system to terminate the reaction; active charcoal was added at 5% by mass to the reaction mixture solution and 24-hour agitation was conducted; active charcoal was then removed from the resultant through a filter of a pore size of 1 μm; and then, aluminium oxide was added at 4% by mass to the filtrate and 24-hour agitation was conducted to adsorb and remove the catalyst. Aluminium oxide was removed through a filter of a pore size of 0.1 μm. The filtrate was concentrated under reduced pressure with an evaporator, to obtain the triblock polymer of PIPP/EVE/PIPP series.

The mean composition (in molar ratio) of the triblock polymer is PIPP/EVE=12/88, with a weight average molecular weight Mw of 11,100 and a number average molecular weight Mn of 8,500 at a molecular weight distribution (dispersion degree: Mw/Mn) of 1.30.

Example 7

Production of P-Tert-Butoxystyrene/Ethyl Vinyl Ether/P-Tert-Butoxystyrene-Series Triblock Polymer A glass container with a three way valve was prepared; after the inside of the glass container was substituted with argon, the glass container was heated in argon atmosphere to remove the water adsorbed to the inside of the glass container. 0.35 M of EVE, 0.35 M of ethyl acetate, 14.8 mM of 1,4-bis (1-acetoxyethoxy)butane, and 2.4 L of toluene were placed in the container, and just when the temperature of the system reached 0° C., a toluene solution (10.3 mM) of $Et_{1.5}AlCl_{1.5}$ was added to the glass container to initiate the polymerization.

The EVE conversion ratio was monitored by GC periodically over time. On completion of the conversion of the EVE monomer, 1.25 M of PTBOS was added to the reaction solution; subsequently, a toluene solution (16 mM) of $SnCl_4$ was added taking time of 16 hours, and the reaction was promoted for another 3 hours.

An ammonia methanol solution was added to the polymerization system to terminate the reaction, and the reaction mixture solution was rinsed with dilute hydrochloric acid. The polymerization solution after rinsing was concentrated under reduced pressure with an evaporator, to obtain a triblock polymer of PTBOS/EVE/PTBOS series.

The mean composition (in molar ratio) of the triblock polymer is PTBOS/EVE=80/20, with a weight average molecular weight Mw of 18,200 and a number average molecular weight Mn of 13,900 at a molecular weight distribution (dispersion degree: Mw/Mn) of 1.32.

INDUSTRIAL APPLICABILITY

In accordance with the invention, a novel ABA-type triblock polymer comprising polyvinyl ether as the soft segment and an oxystyrene-series polymer as the hard segment can be obtained readily, so that a copolymer resin with great thermal shock resistance, thermal stability, solubility in solvents and adhesion to substrate can be obtained. Owing to such characteristic properties, the copolymer resin is useful as a raw material for photosensitive resins for applications such as layer insulation films and surface protective films of semiconductor devices.

The invention claimed is:

1. An ABA triblock copolymer of vinyl ether series comprising:
Segment A comprising an oxystyrene-series repeat unit (a) represented by the following general formula (1):

[Formula 1]

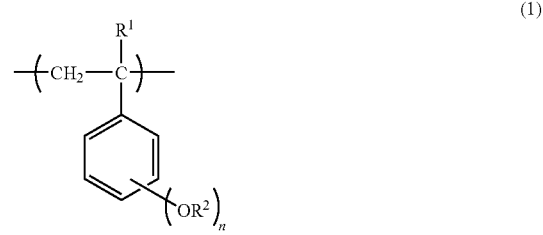

wherein in the formula, $R^1$ represents hydrogen atom or an alkyl group with 1 to 4 carbon atoms; $R^2$ is hydrogen atom; and n represents a numerical figure of 1 or 2; and
Segment B comprising vinyl ether-series repeat unit (b) represented by the following general formula (2):

[Formula 2]

wherein in the formula, $R^3$ represents a linear or branched alkyl group with 1 to 6 carbon atoms, a fluoroalkyl group as a linear or branched alkyl group with 1 to 6 carbon atoms in which all or a part of the hydrogens in the alkyl group is substituted with fluorine, an alkoxyalkyl group with 2 to 6 carbon atoms, a cycloalkyl group with 5 to 10 carbon atoms or an aryl group or arylalkyl group represented by

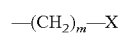

wherein m is 0, 1, 2 or 3; X represents unsubstituted phenyl group, or phenyl group substituted with one or more linear or branched alkyl groups with one to 4 carbon atoms, a fluoroalkyl group as a linear or branched alkyl group with 1 to 4 carbon atoms in which all or a part of the hydrogens is substituted with fluorine, an alkoxy group with 1 to 4 carbon atoms, or a halogen atom,
wherein each Segment A is attached to the Segment B via a carbon-carbon single bond.

2. An ABA triblock copolymer of vinyl ether series according to claim 1, wherein the ratio of the repeat unit (a) and the ratio of the repeat unit (b) to the total repeat units contained in the polymer chain is 5 to 80 mol % and 20 to 95 mol %, respectively.

3. An ABA triblock copolymer of vinyl ether series according to claim 1 or 2, wherein the weight average molecular weight (Mw) on a polystyrene basis as measured by gel permeation chromatography (GPC) is within a range of 1,000 to 100,000, and the dispersion degree (Mw/Mn) represented as the ratio of the weight average molecular weight (Mw) to the number average molecular weight (Mn) is 2.0 or less.

4. A process of producing an ABA block copolymer of vinyl ether series according to claim 1, comprising living cationic polymerization of a vinyl ether-series monomer represented by the following general formula (3) in the presence of a bifunctional initiator, a Lewis acid and a solvent:

[Formula 3]

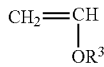

(3)

(wherein in the formula, $R^3$ represents a linear or branched alkyl group with 1 to 6 carbon atoms, a fluoroalkyl group as a linear or branched alkyl group with 1 to 6 carbon atoms in which all or a part of the hydrogens in the alkyl group is substituted with fluorine, an alkoxyalkyl group with 2 to 6 carbon atoms, a cycloalkyl group with 5 to 10 carbon atoms or an aryl group or arylalkyl group represented by

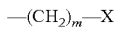

(herein, m is 0, 1, 2 or 3; X represents unsubstituted phenyl group, or phenyl group substituted with one or more linear or branched alkyl groups with 1 to 4 carbon atoms, a fluoroalkyl group as a linear or branched alkyl group with 1 to 4 carbon atoms, where all or a part of the hydrogens is substituted with fluorine, an alkoxy group with 1 to 4 carbon atoms, or a halogen atom)], and subsequently adding an oxystyrene-series monomer represented by the following general formula (4) for living cationic polymerization:

[Formula 4]

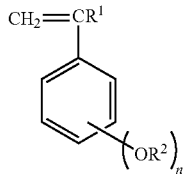

(4)

(wherein in the formula, $R^1$ represents hydrogen atom or a linear or branched alkyl group with 1 to 4 carbon atoms; $R^2$ is a hydrogen atom; and n represents a numerical figure of 1 or 2).

5. A process of producing an ABA block copolymer of vinyl ether series according to claim 4, wherein the bifunctional initiator is of a structure represented by the following general formula (5)

[Formula 5]

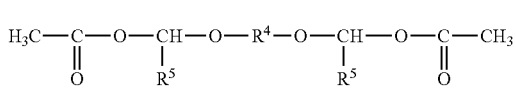

(5)

(wherein in the formula, $R^4$ represents an alkylene group with 1 to 10 carbon atoms; and $R^5$ represents hydrogen atom or an alkyl group with 1 to 4 carbon atoms).

6. A process of producing an ABA block copolymer of vinyl ether series according to claim 4 or 5, comprising using two types of Lewis acids in combination to introduce one of the two types of Lewis acids in the system and to introduce simultaneously or subsequently the other of the two types of Lewis acids.

7. A process of producing an ABA block copolymer of vinyl ether series according to claim 6, comprising living cationic polymerization of a vinyl ether-series monomer represented by the general formula (3) in the presence of an organic metal halide as a Lewis acid and living cationic polymerization of an oxystyrene-series monomer represented by the general formula (4) in the presence of a metal halide as a Lewis acid.

8. A process of producing an ABA block copolymer of vinyl ether series according to claim 7, comprising adding the metal halide in fractional amounts or in a continuous manner.

9. An ABA triblock copolymer of vinyl ether series comprising:

Segment A comprising an oxystyrene-series repeat unit (a) represented by the following general formula (1):

[Formula 1]

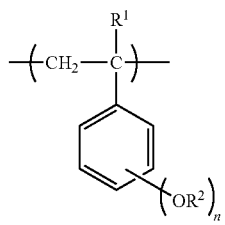

(1)

wherein in the formula, $R^1$ represents hydrogen atom or an alkyl group with 1 to 4 carbon atoms; $R^2$ is a tert-butyl group; and n represents a numerical figure of 1 or 2; and Segment B comprising vinyl ether-series repeat unit (b) represented by the following general formula (2):

[Formula 2]

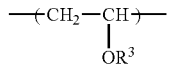

(2)

wherein in the formula, $R^3$ represents a linear or branched alkyl group with 1 to 6 carbon atoms, a fluoroalkyl group as a linear or branched alkyl group with 1 to 6 carbon atoms in which all or a part of the hydrogens in the alkyl group is substituted with fluorine, an alkoxyalkyl group with 2 to 6 carbon atoms, a cycloalkyl group with 5 to 10 carbon atoms or an aryl group or arylalkyl group represented by

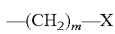

wherein m is 0, 1, 2 or 3; X represents unsubstituted phenyl group, or phenyl group substituted with one or more linear or branched alkyl groups with one to 4 carbon atoms, a fluoroalkyl group as a linear or branched alkyl group with 1 to 4 carbon atoms in which all or a part of the hydrogens is substituted with fluorine, an alkoxy group with 1 to 4 carbon atoms, or a halogen atom, wherein each Segment A is attached to the Segment B via a carbon-carbon single bond.

10. An ABA triblock copolymer of vinyl ether series according to claim 9, wherein the ratio of the repeat unit (a)

and the ratio of the repeat unit (b) to the total repeat units contained in the polymer chain is 5 to 80 mol % and 20 to 95 mol %, respectively.

11. An ABA triblock copolymer of vinyl ether series according to claim 9, wherein the weight average molecular weight (Mw) on a polystyrene basis as measured by gel permeation chromatography (GPC) is within a range of 1,000 to 100,000, and the dispersion degree (Mw/Mn) represented as the ratio of the weight average molecular weight (Mw) to the number average molecular weight (Mn) is 2.0 or less.

12. A process of producing an ABA block copolymer of vinyl ether series according to claim 9, comprising living cationic polymerization of a vinyl ether-series monomer represented by the following general formula (3) in the presence of a bifunctional initiator, a Lewis acid and a solvent:

[Formula 3]

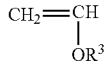

(3)

(wherein in the formula, $R^3$ represents a linear or branched alkyl group with 1 to 6 carbon atoms, a fluoroalkyl group as a linear or branched alkyl group with 1 to 6 carbon atoms in which all or a part of the hydrogens in the alkyl group is substituted with fluorine, an alkoxyalkyl group with 2 to 6 carbon atoms, a cycloalkyl group with 5 to 10 carbon atoms or an aryl group or arylalkyl group represented by —(CH$_2$)$_m$—X (herein, m is 0, 1, 2 or 3; X represents unsubstituted phenyl group, or phenyl group substituted with one or more linear or branched alkyl groups with 1 to 4 carbon atoms, a fluoroalkyl group as a linear or branched alkyl group with 1 to 4 carbon atoms, where all or a part of the hydrogens is substituted with fluorine, an alkoxy group with 1 to 4 carbon atoms, or a halogen atom)], and subsequently adding an oxystyrene-series monomer represented by the following general formula (4) for living cationic polymerization:

[Formula 4]

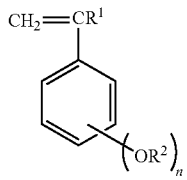

(4)

(wherein in the formula, $R^1$ represents hydrogen atom or a linear or branched alkyl group with 1 to 4 carbon atoms; $R^2$ is a tert-butyl group; and n represents a numerical figure of 1 or 2).

13. A process of producing an ABA block copolymer of vinyl ether series according to claim 12, wherein the bifunctional initiator is of a structure represented by the following general formula (5)

[Formula 5]

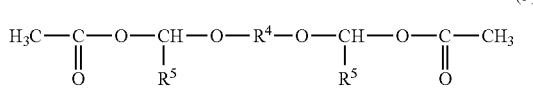

(5)

(wherein in the formula, $R^4$ represents an alkylene group with 1 to 10 carbon atoms; and $R^5$ represents hydrogen atom or an alkyl group with 1 to 4 carbon atoms).

14. A process of producing an ABA block copolymer of vinyl ether series according to claim 12, comprising using two types of Lewis acids in combination to introduce one of the two types of Lewis acids in the system and to introduce simultaneously or subsequently the other of the two types of Lewis acids.

15. A process of producing an ABA block copolymer of vinyl ether series according to claim 14, comprising living cationic polymerization of a vinyl ether-series monomer represented by the general formula (3) in the presence of an organic metal halide as a Lewis acid and living cationic polymerization of an oxystyrene-series monomer represented by the general formula (4) in the presence of a metal halide as a Lewis acid.

16. A process of producing an ABA block copolymer of vinyl ether series according to claim 15, comprising adding the metal halide in fractional amounts or in a continuous manner.

17. An ABA triblock copolymer of vinyl ether series comprising:

Segment A comprising an oxystyrene-series repeat unit (a) represented by the following general formula (1):

[Formula 1]

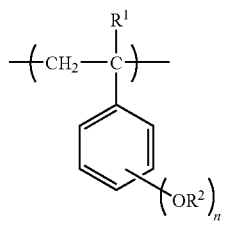

(1)

wherein in the formula, $R^1$ represents hydrogen atom or an alkyl group with 1 to 4 carbon atoms; $R^2$ is an acetyl group; and n represents a numerical figure of 1 or 2; and Segment B comprising vinyl ether-series repeat unit (b) represented by the following general formula (2):

[Formula 2]

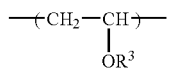

(2)

wherein in the formula, $R^3$ represents a linear or branched alkyl group with 1 to 6 carbon atoms, a fluoroalkyl group as a linear or branched alkyl group with 1 to 6 carbon atoms in which all or a part of the hydrogens in the alkyl group is substituted with fluorine, an alkoxyalkyl group with 2 to 6 carbon atoms, a cycloalkyl group with 5 to 10 carbon atoms or an aryl group or arylalkyl group represented by —(CH$_2$)$_m$—X wherein m is 0, 1, 2 or 3; X represents unsubstituted phenyl group, or phenyl group substituted with one or more linear or branched alkyl groups with one to 4 carbon atoms, a fluoroalkyl group as a linear or branched alkyl group with 1 to 4 carbon atoms in which all or a part of the hydrogens is substituted with fluorine, an alkoxy group with 1 to 4 carbon atoms, or a halogen atom, wherein each Segment A is attached to the Segment B via a carbon-carbon single bond.

18. An ABA triblock copolymer of vinyl ether series according to claim 17, wherein the ratio of the repeat unit (a) and the ratio of the repeat unit (b) to the total repeat units contained in the polymer chain is 5 to 80 mol % and 20 to 95 mol %, respectively.

19. An ABA triblock copolymer of vinyl ether series according to claim 17, wherein the weight average molecular weight (Mw) on a polystyrene basis as measured by gel permeation chromatography (GPC) is within a range of 1,000 to 100,000, and the dispersion degree (Mw/Mn) represented as the ratio of the weight average molecular weight (Mw) to the number average molecular weight (Mn) is 2.0 or less.

20. A process of producing an ABA block copolymer of vinyl ether series according to claim 17, comprising living cationic polymerization of a vinyl ether-series monomer represented by the following general formula (3) in the presence of a bifunctional initiator, a Lewis acid and a solvent:

[Formula 3]

$$CH_2=CH \atop | \atop OR^3 \qquad (3)$$

(wherein in the formula, R$^3$ represents a linear or branched alkyl group with 1 to 6 carbon atoms, a fluoroalkyl group as a linear or branched alkyl group with 1 to 6 carbon atoms in which all or a part of the hydrogens in the alkyl group is substituted with fluorine, an alkoxyalkyl group with 2 to 6 carbon atoms, a cycloalkyl group with 5 to 10 carbon atoms or an aryl group or arylalkyl group represented by —(CH$_2$)$_n$—X (herein, m is 0, 1, 2 or 3; X represents unsubstituted phenyl group, or phenyl group substituted with one or more linear or branched alkyl groups with 1 to 4 carbon atoms, a fluoroalkyl group as a linear or branched alkyl group with 1 to 4 carbon atoms, where all or a part of the hydrogens is substituted with fluorine, an alkoxy group with 1 to 4 carbon atoms, or a halogen atom)], and subsequently adding an oxystyrene-series monomer represented by the following general formula (4) for living cationic polymerization:

[Formula 4]

(4)

(wherein in the formula, R$^1$ represents hydrogen atom or a linear or branched alkyl group with 1 to 4 carbon atoms; R$^2$ is an acetyl group; and n represents a numerical figure of 1 or 2).

21. A process of producing an ABA block copolymer of vinyl ether series according to claim 20, wherein the bifunctional initiator is of a structure represented by the following general formula (5)

[Formula 5]

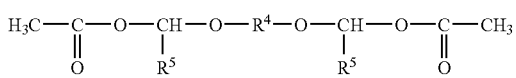

(5)

(wherein in the formula, R$^4$ represents an alkylene group with 1 to 10 carbon atoms; and R$^5$ represents hydrogen atom or an alkyl group with 1 to 4 carbon atoms).

22. A process of producing an ABA block copolymer of vinyl ether series according to claim 20, comprising using two types of Lewis acids in combination to introduce one of the two types of Lewis acids in the system and to introduce simultaneously or subsequently the other of the two types of Lewis acids.

23. A process of producing an ABA block copolymer of vinyl ether series according to claim 22, comprising living cationic polymerization of a vinyl ether-series monomer represented by the general formula (3) in the presence of an organic metal halide as a Lewis acid and living cationic polymerization of an oxystyrene-series monomer represented by the general formula (4) in the presence of a metal halide as a Lewis acid.

24. A process of producing an ABA block copolymer of vinyl ether series according to claim 23, comprising adding the metal halide in fractional amounts or in a continuous manner.

* * * * *